United States Patent
Thobhani et al.

(10) Patent No.: US 10,621,580 B1
(45) Date of Patent: *Apr. 14, 2020

(54) SYSTEM AND METHOD FOR IDENTIFYING AND PREVENTING ON-LINE FRAUD

(75) Inventors: Akbar A. Thobhani, Santa Monica, CA (US); Kyle Huebner, Manhattan Beach, CA (US); Steve Spring, Agoura Hills, CA (US)

(73) Assignee: Stamps.com Inc., Elsegundo, CA (US)

(*) Notice: Subject to any disclaimer, the term of this patent is extended or adjusted under 35 U.S.C. 154(b) by 1526 days.

This patent is subject to a terminal disclaimer.

(21) Appl. No.: 12/566,461

(22) Filed: Sep. 24, 2009

Related U.S. Application Data

(63) Continuation of application No. 11/616,529, filed on Dec. 27, 2006, now Pat. No. 9,779,556.

(51) Int. Cl.
*G06Q 20/40* (2012.01)

(52) U.S. Cl.
CPC ....... *G06Q 20/401* (2013.01); *G06Q 2250/05* (2013.01)

(58) Field of Classification Search
CPC ........ G06Q 30/0207–0277; G06Q 20/00–425; G06Q 2250/00–905
USPC ...................................... 705/50–79
See application file for complete search history.

(56) References Cited

U.S. PATENT DOCUMENTS

| | | |
|---|---|---|
| 3,833,795 A | 9/1974 | Shoshani et al. |
| 4,447,890 A | 5/1984 | Duwel et al. |
| 4,725,718 A | 2/1988 | Sansone et al. |
| 4,743,747 A | 5/1988 | Fougere et al. |

(Continued)

FOREIGN PATENT DOCUMENTS

| | | |
|---|---|---|
| EP | 0780809 A2 | 6/1997 |
| EP | 0927957 A2 | 7/1999 |

OTHER PUBLICATIONS

STIC Search Report EIC 3600, Various web site pages from the site www.stamps.com collected together in the file "stamps.com_waybl" from U.S. Appl. No. 11/616,513, search dated Sep. 24, 2009.

(Continued)

*Primary Examiner* — Chrystina E Zelaskiewicz
(74) *Attorney, Agent, or Firm* — Norton Rose Fulbright US LLP

(57) ABSTRACT

The present invention is directed to systems and methods which identify fraudulent situations during the transaction phase. In one embodiment, such detection is accomplished by monitoring for situations either outside the range of normal for the general population or outside the range of normal for this particular user. The normal range could be rule driven and, for example, could include size of a given purchase, frequency of purchases, identity the equipment being utilized for the current transaction, etc. The rule could be relaxed or tightened, at least in part, based on the length of time that the user has been a customer and the user's past payment history. In one embodiment, device ids are used to detect fraudulent users. These device (or software) ids could, for example, be a "fingerprint" of the user's equipment, or a "cookie" previously downloaded to the user that identifies the user to the fulfillment system. In situations where fraud is detected downloading the value to the user is interrupted.

29 Claims, 5 Drawing Sheets

(56) References Cited

U.S. PATENT DOCUMENTS

| | | |
|---|---|---|
| 4,757,537 A | 7/1988 | Edelmann et al. |
| 4,775,246 A | 10/1988 | Edelmann et al. |
| 4,780,828 A | 10/1988 | Whisker |
| 4,802,218 A | 1/1989 | Wright et al. |
| 4,812,994 A | 3/1989 | Taylor et al. |
| 4,831,555 A | 5/1989 | Sansone et al. |
| 4,837,702 A | 6/1989 | Obrea |
| 4,853,865 A | 8/1989 | Sansone et al. |
| 4,872,706 A | 10/1989 | Brewen et al. |
| 4,900,903 A | 2/1990 | Wright et al. |
| 4,900,904 A | 2/1990 | Wright et al. |
| 4,907,268 A | 3/1990 | Bosen et al. |
| 4,908,770 A | 3/1990 | Breault et al. |
| 4,933,849 A | 6/1990 | Connell et al. |
| 4,935,961 A | 6/1990 | Gargiulo et al. |
| 4,939,674 A | 7/1990 | Price et al. |
| 4,949,381 A | 8/1990 | Pastor |
| 4,980,542 A | 12/1990 | Jackson et al. |
| 5,048,085 A | 9/1991 | Abraham et al. |
| 5,055,657 A | 10/1991 | Miller et al. |
| 5,058,008 A | 10/1991 | Schumacher |
| 5,060,263 A | 10/1991 | Bosen et al. |
| 5,075,865 A | 12/1991 | Kawamura et al. |
| 5,111,030 A | 5/1992 | Brasington et al. |
| 5,122,967 A | 6/1992 | Gilham |
| 5,142,577 A | 8/1992 | Pastor |
| 5,181,245 A | 1/1993 | Jones |
| 5,241,483 A | 8/1993 | Porret et al. |
| 5,265,221 A | 11/1993 | Miller |
| 5,319,562 A | 6/1994 | Whitehouse |
| 5,325,519 A | 6/1994 | Long et al. |
| 5,328,439 A | 7/1994 | Goldberg |
| 5,341,505 A | 8/1994 | Whitehouse |
| 5,367,148 A | 11/1994 | Storch et al. |
| 5,377,268 A | 12/1994 | Hunter |
| 5,379,391 A | 1/1995 | Belsan et al. |
| 5,384,886 A | 1/1995 | Rourke |
| 5,390,251 A | 2/1995 | Pastor et al. |
| 5,408,416 A | 4/1995 | Gilham |
| 5,442,162 A | 8/1995 | Armel |
| 5,448,641 A | 9/1995 | Pintsov et al. |
| 5,452,654 A | 9/1995 | Connell et al. |
| 5,454,038 A | 9/1995 | Cordery et al. |
| 5,471,925 A | 12/1995 | Heinrich et al. |
| 5,491,495 A | 2/1996 | Ward et al. |
| 5,495,411 A | 2/1996 | Ananda |
| 5,548,645 A | 8/1996 | Ananda |
| 5,559,934 A | 9/1996 | Ogura et al. |
| 5,561,795 A | 10/1996 | Sarkar |
| 5,570,465 A | 10/1996 | Tsakanikas |
| 5,573,277 A | 11/1996 | Petkovsek |
| 5,598,477 A | 1/1997 | Berson |
| 5,600,562 A | 2/1997 | Guenther |
| 5,602,743 A | 2/1997 | Freytag |
| 5,621,797 A | 4/1997 | Rosen |
| 5,621,864 A | 4/1997 | Benade et al. |
| 5,626,288 A | 5/1997 | Petkovsek |
| 5,655,023 A | 8/1997 | Cordery et al. |
| 5,659,616 A | 8/1997 | Sudia |
| 5,666,421 A | 9/1997 | Pastor et al. |
| 5,668,897 A | 9/1997 | Stolfo |
| 5,671,146 A | 9/1997 | Windel et al. |
| 5,680,829 A | 10/1997 | Slayden et al. |
| 5,684,951 A | 11/1997 | Goldman et al. |
| 5,715,314 A | 2/1998 | Payne et al. |
| 5,717,596 A | 2/1998 | Bernard et al. |
| 5,717,597 A | 2/1998 | Kara |
| 5,729,460 A | 3/1998 | Plett et al. |
| 5,729,734 A | 3/1998 | Parker et al. |
| 5,737,729 A | 4/1998 | Denman |
| 5,742,683 A | 4/1998 | Lee et al. |
| 5,768,132 A | 6/1998 | Cordery et al. |
| 5,778,348 A | 7/1998 | Manduley et al. |
| 5,781,438 A | 7/1998 | Lee et al. |
| 5,781,634 A | 7/1998 | Cordery et al. |
| 5,793,867 A | 8/1998 | Cordery et al. |
| 5,796,841 A | 8/1998 | Cordery et al. |
| 5,801,364 A | 9/1998 | Kara et al. |
| 5,801,944 A | 9/1998 | Kara |
| 5,812,990 A | 9/1998 | Ryan, Jr. et al. |
| 5,812,991 A | 9/1998 | Kara |
| 5,815,577 A | 9/1998 | Clark |
| 5,819,240 A | 10/1998 | Kara |
| 5,822,739 A | 10/1998 | Kara |
| 5,825,893 A | 10/1998 | Kara |
| 5,848,401 A | 12/1998 | Goldberg et al. |
| 5,867,578 A | 2/1999 | Brickell et al. |
| 5,871,288 A | 2/1999 | Ryan, Jr. et al. |
| 5,917,924 A | 6/1999 | Herbert |
| 5,918,234 A | 6/1999 | Shah et al. |
| 5,923,406 A | 7/1999 | Brasington et al. |
| 5,930,796 A | 7/1999 | Pierce et al. |
| 5,940,383 A | 8/1999 | Willkie |
| 5,949,680 A | 9/1999 | Kettelkamp |
| 5,953,427 A | 9/1999 | Cordery et al. |
| 5,956,404 A | 9/1999 | Schneier et al. |
| 5,957,053 A | 9/1999 | Hayama |
| 5,960,411 A | 9/1999 | Hartman et al. |
| 5,978,013 A | 11/1999 | Jones et al. |
| 5,978,484 A | 11/1999 | Apperson et al. |
| 5,983,227 A | 11/1999 | Nazem et al. |
| 5,987,441 A | 11/1999 | Lee et al. |
| 5,988,897 A | 11/1999 | Pierce et al. |
| 5,995,985 A | 11/1999 | Cai |
| 6,005,945 A | 12/1999 | Whitehouse |
| 6,009,415 A | 12/1999 | Shurling et al. |
| 6,009,417 A | 12/1999 | Brookner et al. |
| 6,010,156 A | 1/2000 | Block |
| 6,012,890 A | 1/2000 | Celorio Garrido |
| 6,026,385 A | 2/2000 | Harvey et al. |
| 6,029,137 A * | 2/2000 | Cordery ............. G07B 17/0008 705/401 |
| 6,030,000 A | 2/2000 | Diamond |
| 6,031,020 A | 2/2000 | Mehta et al. |
| 6,041,411 A | 3/2000 | Wyatt |
| 6,049,671 A | 4/2000 | Slivka et al. |
| 6,058,384 A | 5/2000 | Pierce et al. |
| 6,061,671 A | 5/2000 | Baker et al. |
| 6,064,991 A | 5/2000 | Reisinger et al. |
| 6,064,993 A | 5/2000 | Ryan, Jr. |
| 6,065,117 A | 5/2000 | White |
| 6,070,150 A | 5/2000 | Remington et al. |
| 6,081,810 A | 6/2000 | Rosenzweig et al. |
| 6,098,058 A | 8/2000 | Gravell et al. |
| 6,105,063 A | 8/2000 | Hayes, Jr. |
| 6,108,643 A | 8/2000 | Sansone |
| 6,134,582 A | 10/2000 | Kennedy |
| 6,151,591 A | 11/2000 | Pierce et al. |
| 6,155,604 A | 12/2000 | Greene et al. |
| 6,161,139 A | 12/2000 | Win et al. |
| 6,164,528 A | 12/2000 | Hills et al. |
| 6,166,729 A | 12/2000 | Acosta et al. |
| 6,173,209 B1 | 1/2001 | Laval et al. |
| 6,192,165 B1 | 2/2001 | Irons |
| 6,192,349 B1 | 2/2001 | Husemann et al. |
| 6,208,980 B1 | 3/2001 | Kara |
| 6,209,920 B1 | 4/2001 | Fabel |
| 6,223,166 B1 | 4/2001 | Kay |
| 6,226,752 B1 | 5/2001 | Gupta et al. |
| 6,233,565 B1 | 5/2001 | Lewis et al. |
| 6,233,568 B1 | 5/2001 | Kara |
| 6,244,763 B1 | 6/2001 | Miller |
| 6,249,777 B1 | 6/2001 | Kara et al. |
| 6,275,824 B1 | 8/2001 | O'Flaherty et al. |
| 6,286,098 B1 | 9/2001 | Wenig et al. |
| 6,296,404 B1 | 10/2001 | Pierce et al. |
| 6,311,214 B1 | 10/2001 | Rhoads |
| 6,324,523 B1 | 11/2001 | Killeen, Jr. et al. |
| 6,334,108 B1 | 12/2001 | Deaton et al. |
| 6,338,049 B1 | 1/2002 | Walker et al. |
| 6,341,274 B1 | 1/2002 | Leon |
| 6,353,926 B1 | 3/2002 | Parthesarathy et al. |
| 6,367,013 B1 | 4/2002 | Bisbee et al. |
| 6,381,589 B1 | 4/2002 | Leon |

(56) References Cited

U.S. PATENT DOCUMENTS

| | | |
|---|---|---|
| 6,385,504 B1 | 5/2002 | Pintsov et al. |
| 6,385,654 B1 | 5/2002 | Tanaka |
| 6,385,731 B2 | 5/2002 | Ananda |
| 6,405,929 B1 | 6/2002 | Ehrhart et al. |
| 6,408,286 B1 | 6/2002 | Heiden |
| 6,415,983 B1 | 7/2002 | Ulvr et al. |
| 6,424,954 B1 | 7/2002 | Leon |
| 6,427,021 B1 | 7/2002 | Fischer et al. |
| 6,434,238 B1 | 8/2002 | Chaum et al. |
| 6,446,204 B1 | 9/2002 | Pang et al. |
| 6,461,083 B1 | 10/2002 | Miller et al. |
| 6,466,921 B1 | 10/2002 | Cordery et al. |
| 6,473,500 B1 | 10/2002 | Risafi et al. |
| 6,473,743 B1 | 10/2002 | Ryan, Jr. |
| 6,496,932 B1 * | 12/2002 | Trieger .................. H04L 29/06 380/277 |
| 6,505,179 B1 | 1/2003 | Kara |
| 6,505,773 B1 | 1/2003 | Palmer et al. |
| 6,505,980 B1 | 1/2003 | Allday |
| 6,525,835 B1 | 2/2003 | Gulati |
| 6,526,393 B1 | 2/2003 | Fredman |
| 6,546,377 B1 | 4/2003 | Gravell et al. |
| 6,555,579 B2 | 4/2003 | Kritchevsky |
| 6,567,794 B1 | 5/2003 | Cordery et al. |
| 6,587,860 B1 | 7/2003 | Saigo et al. |
| 6,592,027 B2 | 7/2003 | Kovlakas |
| 6,594,374 B1 | 7/2003 | Beckstrom et al. |
| 6,609,117 B2 | 8/2003 | Sutherland et al. |
| 6,615,194 B1 | 9/2003 | Deutsch et al. |
| 6,636,983 B1 | 10/2003 | Levi |
| 6,655,579 B1 | 12/2003 | Delman et al. |
| 6,674,542 B1 | 1/2004 | Shimamura |
| 6,687,684 B1 * | 2/2004 | Whitehouse ..... G07B 17/00435 705/408 |
| 6,687,884 B1 | 2/2004 | Whitehouse et al. |
| 6,701,304 B2 | 3/2004 | Leon |
| 6,722,563 B1 | 4/2004 | Johnson et al. |
| 6,735,575 B1 | 5/2004 | Kara |
| 6,823,319 B1 | 11/2004 | Lynch et al. |
| 6,842,742 B1 | 1/2005 | Brookner |
| 6,868,406 B1 | 3/2005 | Ogg et al. |
| 6,883,140 B1 | 4/2005 | Acker et al. |
| 6,939,063 B2 | 9/2005 | Bussell |
| 6,972,859 B1 | 12/2005 | Patton et al. |
| 6,999,938 B1 | 2/2006 | Libman |
| 7,085,725 B1 | 8/2006 | Leon |
| 7,124,101 B1 | 10/2006 | Mikurak |
| 7,149,726 B1 | 12/2006 | Lingle et al. |
| 7,162,460 B2 | 1/2007 | Cleckler et al. |
| 7,191,158 B2 | 3/2007 | Ogg |
| 7,194,957 B1 * | 3/2007 | Leon et al. .................. 101/485 |
| 7,243,842 B1 | 7/2007 | Leon et al. |
| 7,260,194 B1 | 8/2007 | Meyers et al. |
| 7,272,728 B2 * | 9/2007 | Pierson et al. ................ 713/194 |
| 7,577,618 B2 | 8/2009 | Raju et al. |
| 7,933,845 B1 | 4/2011 | Leon et al. |
| 8,126,821 B2 | 2/2012 | Uslontsev et al. |
| 8,360,313 B1 | 1/2013 | Leon et al. |
| 8,548,921 B2 | 10/2013 | Raju et al. |
| 2001/0034716 A1 | 10/2001 | Goodwin |
| 2001/0037320 A1 | 11/2001 | Allport et al. |
| 2001/0042052 A1 | 11/2001 | Leon |
| 2001/0055388 A1 | 12/2001 | Kaliski |
| 2002/0023057 A1 | 2/2002 | Goodwin et al. |
| 2002/0033598 A1 | 3/2002 | Beasley |
| 2002/0040353 A1 | 4/2002 | Brown et al. |
| 2002/0046193 A1 | 4/2002 | Bator et al. |
| 2002/0046195 A1 | 4/2002 | Martin et al. |
| 2002/0055900 A1 | 5/2002 | Kansal |
| 2002/0062283 A1 | 5/2002 | Takahashi |
| 2002/0073039 A1 | 6/2002 | Ogg et al. |
| 2002/0083007 A1 | 6/2002 | Sutherland et al. |
| 2002/0083020 A1 | 6/2002 | Leon |
| 2002/0095383 A1 | 7/2002 | Mengin et al. |
| 2002/0107754 A1 | 8/2002 | Stone |
| 2002/0166882 A1 | 11/2002 | Roberts et al. |
| 2002/0178354 A1 | 11/2002 | Ogg et al. |
| 2002/0194119 A1 | 12/2002 | Wright et al. |
| 2003/0037008 A1 | 2/2003 | Raju |
| 2003/0050891 A1 | 3/2003 | Cohen |
| 2003/0055779 A1 | 3/2003 | Wolf |
| 2003/0055780 A1 | 3/2003 | Hansen et al. |
| 2003/0078893 A1 | 4/2003 | Shah et al. |
| 2003/0101143 A1 | 5/2003 | Montgomery et al. |
| 2003/0101148 A1 | 5/2003 | Montgomery et al. |
| 2003/0130914 A1 | 7/2003 | Cinotti et al. |
| 2003/0130954 A1 | 7/2003 | Carr et al. |
| 2003/0140017 A1 | 7/2003 | Patton et al. |
| 2003/0217017 A1 | 11/2003 | Willoughby et al. |
| 2004/0074977 A1 | 4/2004 | Rainey et al. |
| 2004/0088271 A1 | 5/2004 | Cleckler et al. |
| 2004/0133509 A1 | 7/2004 | McCoy et al. |
| 2004/0215523 A1 | 10/2004 | Wulff et al. |
| 2004/0220869 A1 | 11/2004 | Perera |
| 2004/0225536 A1 | 11/2004 | Schoen et al. |
| 2005/0065897 A1 | 3/2005 | Ryan et al. |
| 2005/0075997 A1 | 4/2005 | Rainey et al. |
| 2005/0080693 A1 | 4/2005 | Foss et al. |
| 2005/0080747 A1 | 4/2005 | Anderson et al. |
| 2005/0108165 A1 | 5/2005 | Jones et al. |
| 2005/0114712 A1 | 5/2005 | Devine et al. |
| 2005/0125367 A1 | 6/2005 | Ogg et al. |
| 2005/0144145 A1 | 6/2005 | Ogg et al. |
| 2005/0165674 A1 | 7/2005 | Edwards et al. |
| 2005/0171822 A1 | 8/2005 | Cagan |
| 2005/0187886 A9 | 8/2005 | Stickler et al. |
| 2005/0195214 A1 | 9/2005 | Reid et al. |
| 2005/0234835 A1 | 10/2005 | Stonoha et al. |
| 2005/0256811 A1 * | 11/2005 | Pagel ................. G07B 17/0008 705/401 |
| 2005/0278204 A1 | 12/2005 | Weinberg et al. |
| 2005/0278235 A1 | 12/2005 | Dietrich |
| 2005/0278266 A1 | 12/2005 | Ogg et al. |
| 2006/0015457 A1 | 1/2006 | Hau et al. |
| 2006/0032903 A1 | 2/2006 | Wu |
| 2006/0045244 A1 | 3/2006 | New |
| 2006/0050136 A1 | 3/2006 | MacKay et al. |
| 2006/0053054 A1 | 3/2006 | Baggett et al. |
| 2006/0136237 A1 | 6/2006 | Spiegel et al. |
| 2006/0136325 A1 | 6/2006 | Barry et al. |
| 2006/0143136 A1 | 6/2006 | Low et al. |
| 2006/0173772 A1 | 8/2006 | Hayes et al. |
| 2006/0173777 A1 | 8/2006 | Torres et al. |
| 2006/0178946 A1 | 8/2006 | Agarwal |
| 2006/0190353 A1 | 8/2006 | Williams |
| 2006/0212387 A1 | 9/2006 | Jensen |
| 2006/0218091 A1 | 9/2006 | Choy |
| 2006/0233334 A1 | 10/2006 | Bingaman et al. |
| 2006/0235721 A1 | 10/2006 | Kavanagh et al. |
| 2006/0242059 A1 | 10/2006 | Hansen |
| 2006/0248007 A1 | 11/2006 | Hofer et al. |
| 2006/0248016 A1 | 11/2006 | Ginter et al. |
| 2006/0249570 A1 | 11/2006 | Seifert et al. |
| 2006/0253326 A1 | 11/2006 | Patterson et al. |
| 2006/0253341 A1 | 11/2006 | Goldstein et al. |
| 2006/0265325 A1 | 11/2006 | Fajardo |
| 2006/0271443 A1 | 11/2006 | Cahalane et al. |
| 2006/0273155 A1 | 12/2006 | Thackston |
| 2006/0282327 A1 | 12/2006 | Neal et al. |
| 2006/0282359 A1 | 12/2006 | Nobili et al. |
| 2006/0282372 A1 | 12/2006 | Endres et al. |
| 2006/0293908 A1 | 12/2006 | Becker et al. |
| 2007/0011100 A1 | 1/2007 | Libin et al. |
| 2007/0100672 A1 | 5/2007 | McBrida et al. |
| 2007/0255664 A1 | 11/2007 | Blumberg et al. |
| 2008/0025490 A1 | 1/2008 | Meyers et al. |
| 2009/0219573 A1 | 9/2009 | Ogg et al. |
| 2012/0200893 A1 | 8/2012 | Ogg et al. |

OTHER PUBLICATIONS

U.S. Appl. No. 11/616,529, Akbar Thobhani.
U.S. Appl. No. 60/239,424, Anthony Phoenix.

(56) References Cited

OTHER PUBLICATIONS

U.S. approves stamp software; Catherine Porter. Toronto Star. Toronto, Ont.: Jul. 18, 2002. p. D.05.
Bill would allow some "scalping" of tickets, Marsha Shuler. Advocate. Baton Rouge, La.: May 3, 2006. p. 17.
Scanning, I D & bar coding, Canadian Industrial Equipment News. Oct. 1999. vol. 60, Iss. 10; p. 21.
Stamp paper scam, Mahesh Chandra. Businessline. Chennai: Nov. 12, 2003. p. 1.
Various web site pages from the site www.stamps.com collected together in the file "stamps.com_wayback".
USPS Publication No. 25, "Designing Letter Mail," Aug. 1995. 86 pages.

\* cited by examiner

| | ITEM | THIS USER | AVERAGE OTHER-USERS | LIMIT |
|---|---|---|---|---|
| 402 | POSTAGE $/DAY | $30 | $150 | $75 |
| 403 | POSTAGE ACCESSES/DAY | 2 | 8 | 3 |
| 404 | NUMBER WEEKS THIS ID | 1 | 25 | 10 |
| 405 | POSTAGE $/SESSION | - | $200 | $100 |
| 406 | STOCK BOUGHT | 1000 SHEETS | 100 SHEETS | FLAG |
| 407 | SAME CARD NEW ID | 4 | 2 | FLAG |
| 408 | SAME ID NEW CARD | 5 | 2 | FLAG |
| 409 | CANCELLED CHANGES | $30 | $5 | FLAG |

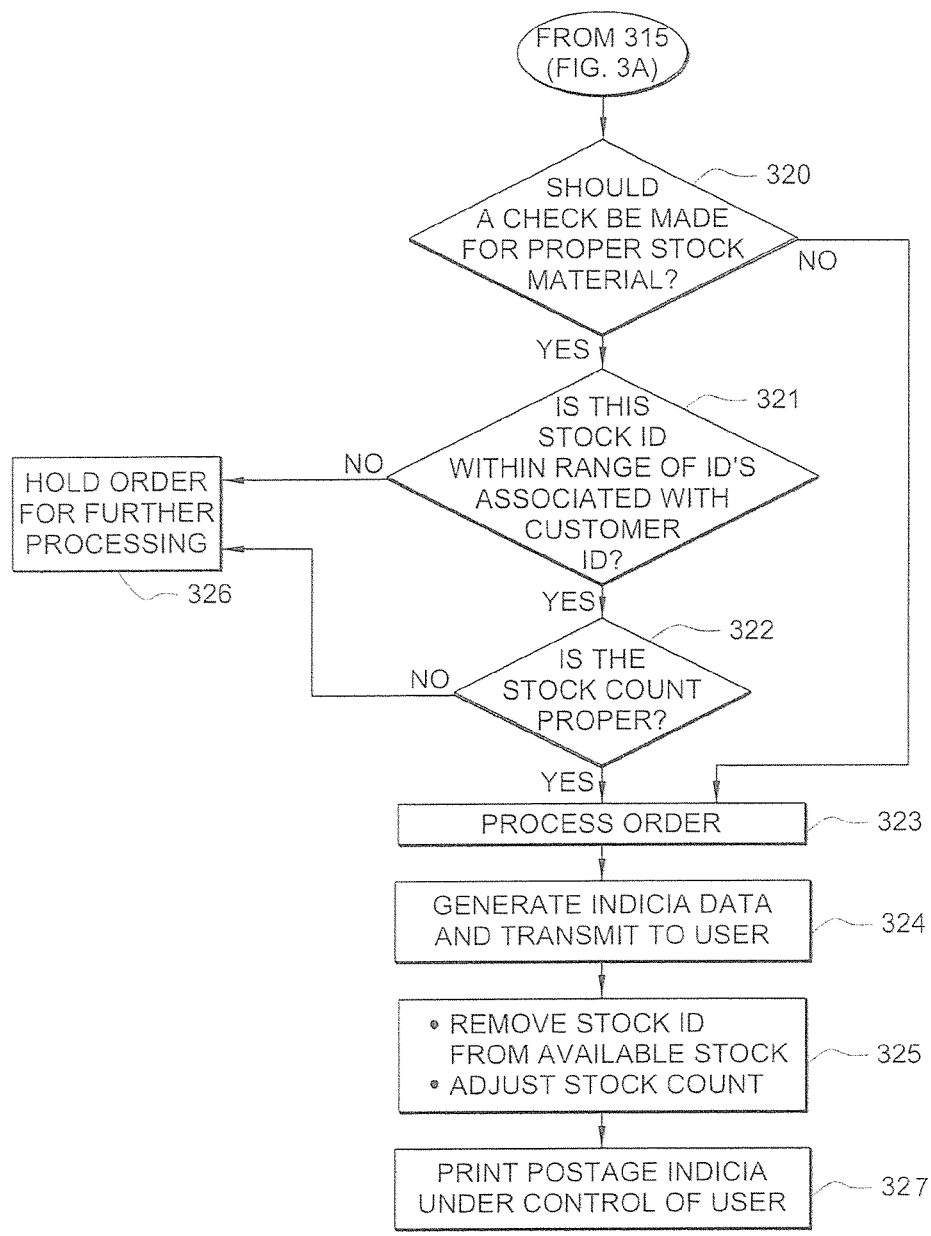

SYSTEM AND METHOD FOR IDENTIFYING AND PREVENTING ON-LINE FRAUD

CROSS-REFERENCE TO RELATED APPLICATIONS

This Application is a Continuation of commonly assigned, U.S. patent application Ser. No. 11/616,529 entitled "SYSTEM AND METHOD FOR IDENTIFYING AND PREVENTING ON-LINE FRAUD," filed on Dec. 27, 2006, the disclosure of which is hereby incorporated herein by reference. The present application is also related to co-pending U.S. patent application Ser. No. 11/616,513 entitled "SYSTEM AND METHOD FOR ON-LINE PRINTING FRAUD PROTECTION;" U.S. patent application Ser. No. 10/197,044, entitled "GENERIC VALUE BEARING ITEM LABELS," filed Jul. 16, 2002; U.S. patent application Ser. No. 09/975,532, entitled "SYSTEM AND METHOD FOR PROVIDING COMPUTER-BASED POSTAGE STAMPS," filed Oct. 10, 2001, now issued U.S. Pat. No. 7,191,158 issued Mar. 13, 2007, which claims the benefit of U.S. Provisional Application No. 60/239,424, entitled "A SYSTEM AND METHOD FOR PROVIDING COMPUTER BASED POSTAGE STAMPS," filed Oct. 10, 2000; U.S. patent application Ser. No. 09/690,066, entitled "CRYPTOGRAPHIC MODULE FOR SECURE PROCESSING OF VALUE-BEARING ITEMS," filed Oct. 16, 2000, now issued U.S. Pat. No. 7,216,110; the disclosures of which are hereby incorporated herein by reference.

TECHNICAL FIELD

This disclosure relates to on-line fraud protection in general and more specifically to systems and methods for fraudulent detection and prevention in on-line value transfer situations. Even more specifically, this disclosure addresses fraud protection when users receive value indicia via Internet facilitated transfer of items of value.

BACKGROUND OF THE INVENTION

Electronic commerce has become commonplace and as the value of such commerce has increased so has the sophistication of criminal activities. Electronic on-line printing of tickets, stamps and other indicia of value allows these items to be printed in the comfort of one's home or office. This relative privacy presents a tempting target for those with a larcenous bent.

In one scenario, a fraudulent user (fraudster) simply uses a stolen or otherwise invalid credit card to order the downloaded material that is printed on paper located at the fraudster's premises. In some situations, one needs to be a member or otherwise have a log-in identity in order to print the desired material. To overcome this requirement, fraudulent user's create a log-on, download what they want, and then stop using the log-on. The next time they desire to print the tickets, postage indicia, etc., they create a new log-on identity using a different credit facility, which often proves to be stolen or otherwise improper.

In other scenarios, the fraudulent user logs onto the system and obtains something of value, for example, a downloaded postage indicia for printing, either immediately or at a subsequent time, onto stock material at the customer's location. In some situations, the transaction turns out to be fraudulent in that the user's credit is not acceptable, the credit facility that was used turns out to be not acceptable, or for any of a number of other reasons the transaction is determined to be improper. One problem with these types of fraudulent situations is that each transaction is independent of previous transactions in that nothing is being shipped to a permanent address and thus each transaction is transient. Attempts to identify the computer (or other electronic address information) are often futile since fraudsters have a facility for masking their electronic identity. In addition, certain intermediary systems, such as ISP providers, often modify (or allow a user to modify) their real addresses and even their machine identities (MAC identifications).

Another method for preventing recurring fraud from the same user is to block the account (log-on) from that user. However, the fraudster then opens a new account using a new phony id. Often, when promotions are being offered it is customary to limit such promotions to "one per customer". In these situations users are tempted to "fake" their identity in order to obtain more than one promotion.

BRIEF SUMMARY OF THE INVENTION

The present invention is directed to systems and methods which identify fraudulent situations during the transaction phase. In one embodiment, such detection is accomplished by monitoring for situations either outside the range of normal for the general population or outside the range of normal for this particular user. The normal range could be rule driven and, for example, could include size of a given purchase, frequency of purchases, identity of equipment being utilized for the current transaction, etc. The rule could be relaxed or tightened, at least in part, based on the length of time that the user has been a customer and the user's past payment history. In one embodiment, device ids are used to detect fraudulent users. These device (or software) ids could, for example, be a "fingerprint" of the user's equipment, of a "cookie" previously downloaded to the user that identifies the user to the fulfillment system. In situations where fraud is detected, downloading the value to the user is interrupted.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIGS. 3A and 3B show one embodiment of a method for controlling the printing of value indicia on stock material.

DETAILED DESCRIPTION OF THE INVENTION

Figure 1:
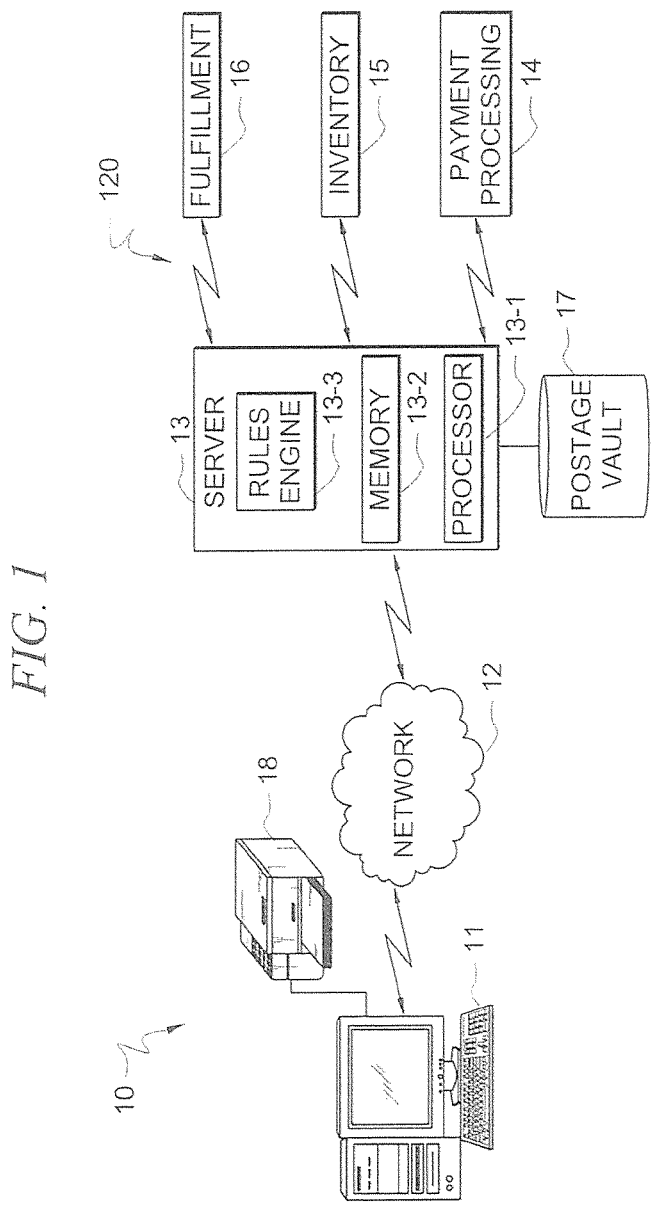
FIG. 1 shows one embodiment of a system for controlling on-line printing of value indicia.

Turning now to FIG. 1, there is shown one embodiment of systems, such as system 10, which allows the user at PC 11 to access a remote location such as location 120 to receive indicia value data to be printed locally on printer 18. In the embodiment shown, the postage indicia, as controlled by indicia value data from server 13 is printed on a sheet of stock, such as stock 100 shown in FIG. 1A. Communication between user PC 11 and the system at location 120 is via a network, such as network 12. It should also be noted that while a PC is shown, any type of computing device can be utilized and the location where the printing occurs can be a single location as shown or can be networked together in an intranet wirelessly or otherwise. Also note that communications between elements can be wire line or wireless, or combinations thereof. As used herein, the work "indicia" can be singular or plural.

When a user desires to print postage indicia, the user must, in one embodiment, obtain the stock material either from a supplier local to the user (a store, or perhaps an on-line supplier other than the on-line supplier of the postage indicia). In some situations, such as the situation of the embodiment, the user obtains the stock material from the same online supplier that supplies the postage. Thus, as will be detailed hereinafter, when a user logs onto the system at location 120, the user identifies him/herself and orders the necessary supplies which are then checked through inventory 15 with payments being processed through processing facility 14. Fulfillment 16 then sends the supplies physically to the user at PC 11. Note that this transaction, i.e., the obtaining of stock material, always precedes the actual downloading of postage in situations where the material is obtained from the vendor since the postage indicia is to be printed (retained) on the obtained stock material by the customer at the customer's location. Also note that the cost of the material is significant less (more than ten times less) than the cost of postage. Thus, there is not very much reason for the fraudster to use invalidly obtained credit facilities for purchasing stock material. In other situations, the indicia can be printed on plain paper such as would occur when the indicia is printed as part of an address label or directly on to an envelope. In these situations the stock material is not purchased. Also, in some situations the indicia is printed at the vendor's location and shipped to the customer.

In situations where the print stock is bought from a vendor other than the vendor supplying the postage indicia data, then the id of the stock material, together with the id of the purchaser is sent to the postage vendor for storage thereat. The user id, both from sales from the postage vendor, or other on-line vendor can be, if desired, augmented by the fingerprint of the buyer. In this situation, the fingerprint can be one or more of the identity of the software being used by the material purchaser, or by the identity of the hardware (such as CPU, hard drive, etc.) of the computer being used by the purchaser or even by the printer associated with the purchaser's computer.

Figure 1A:
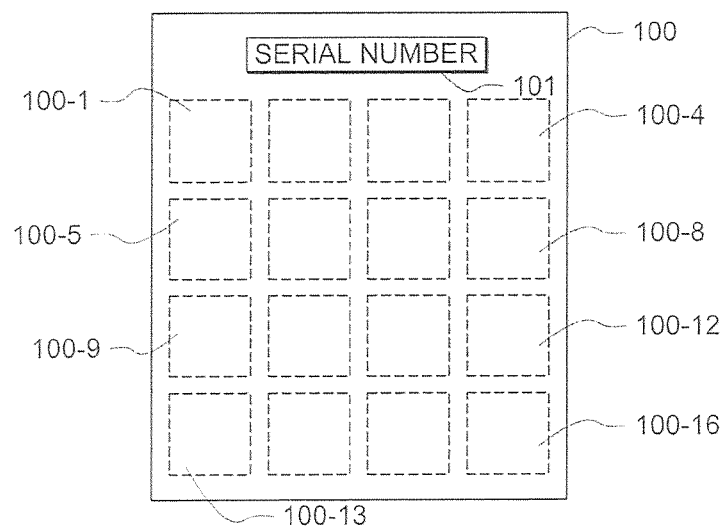
FIGS. 1A and 1B show one embodiment of stock materials.

As will be seen from FIG. 1A, each sheet of stock 100 contains an identity, such as serial number 101, that identifies the stock and allows that sheet of stock material to become associated with a particular user or group of users. Thus, when fulfillment 16, in conjunction with inventory control 15 prepares the stock for delivery, the identity and quantity of stock material is recorded for subsequent use in validating the downloading of postage to a user. For example, the quantity and identity of each piece of stock material obtained by a user, or user group, can be stored in memory 13-2 under of control of processor 13-1. In some situations the serial numbers of stock need not be unique (i.e., more than one customer can have stock with the same serial number) but rather the test can be whether the records show that a present user has print stock with a particular number associated with that user.

Subsequently, after the user obtains physical possession of the stock material at the location of printer 18, the user, using a PC, such as PC 11, or any other appropriate communication device, and network 12, accesses server 13 for the purpose of obtaining postage media data on-line from the vendor at location 120. As has become customary, the user then identifies him/herself to server 13. The user also identifies the stock material, either by verbally saying the serial number(s) of the stock that will be used or by allowing the serial numbers to be read into the system from, for example, printer 18. Any method of communicating the id number (or other form factors) of the printable stock that the customer intends to use can be employed, including, for example, typing the information, scanning, PDF and the like.

During the validation process the system, using rules engine 13-3, will determine if the current transaction is "suspicious" i.e., contains undesirable parameter values. Essentially, the rules cover the amount of postage purchased, the frequency of the purchase and the longevity of the customer as a registered user. Also the parameters contain the fact as to whether or not a user is a regular customer and, for example, how many times has that user changed his/her credit card number. The frequency of credit card number changes is also a "suspicious" activity in that if a user changes the credit facility too often that can be an indication of fraudulent intent. This same thing applies to printing. If a particular user is attempting to (or has) printed unusual amounts of indicia or if the user is printing rather fast compared to the normal average, such that, for example, if a user is attempting to print $10,000 dollars worth of indicia in a day, one can suppose that fraud is occurring. Also, if the postage denominations are unusual, that could be an indication of improper usage.

Note also that while the charges may be made to a valid card and to the proper card holder, that user might, at a later date deny the charges and thus the amount will be charged back to the provider. When this happens it is important that subsequent purchases be inhibited or at least challenged.

In addition, the system keeps track of, for example in memory 13-2, actual parameter values and dates of downloads, postage purchases and/or postage indicia prints from each user (or from those users where there is reason to believe a problem might exist). Then when the volume suddenly changes, or the pattern of activity changes, a flag can be set to be on guard for possible fraudulent activity with respect to a credit facility or with respect to a particular user account.

Registration of the same credit facility to multiple users can be a trigger, as can be changes in account address, printer, computer, etc. Any number of parameters, such as those outlined above, can be stored and the values associated with each such parameter can be used and the range limit set for a group of users or for specific users. These range limits can be varied on a user by user or group by group basis, if desired. The range changes can be based on previous users or groups.

If the rules engine does not flag an indicia order having undesirable parameters, then after payment processing 14 determines that the transaction appears valid, the system matches, if desired, the user id to the serial number(s) and/or any other measured form factors to determine if a proper match exists. If the match is proper and/or if the stock count is proper, as determined from records maintained, for example in memory 13-2, and if the user is not known as a fraudster for other reasons, then postage data from postage vault 17 is sent for storage at PC 11 for subsequent printing under control of PC 11 at printer 18 on stock material 100.

In situations where the rules engine flags a suspicious activity, i.e., an activity or transaction that is outside of the acceptable limits for this particular user, the transaction is either blocked or additional checking, perhaps by a phone call or other personal interaction, is undertaken.

In some situations, the id of the user will identify the user as a trusted user and then material or other form factor matching may be waived, if desired. A trusted user in this context can be defined as desired, but usually would be a user who has been regularly downloading postage indicia without incident for a period of time. This information could be maintained, for example, in a table located in memory 13-2.

Figure 1B:
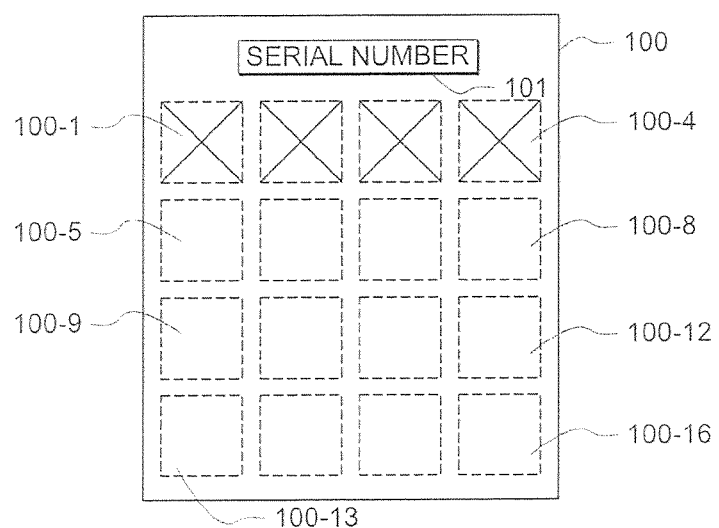

FIG. 1A shows one embodiment of stock 100 having the ability to print sixteen postage indicia (100-1 to 100-16) based upon value sent from postage vault 17 (FIG. 1). In some situations the user may desire to print less than the sixteen available postage indicia at a single time. In such situations, the user will then subsequently log on to server 13 using the same serial number as was previously used. The system would know, perhaps by a record maintained in memory 13-2, that there would only be say twelve possible indicia remaining because four indicia were used previously. This situation is shown in FIG. 1B.

Also under some conditions as will be discussed, multiple sheets of material 100 could have the same serial number and thus the number of pages utilized by the user is maintained so as to prevent fraudulent activity.

Figures 2, 4:
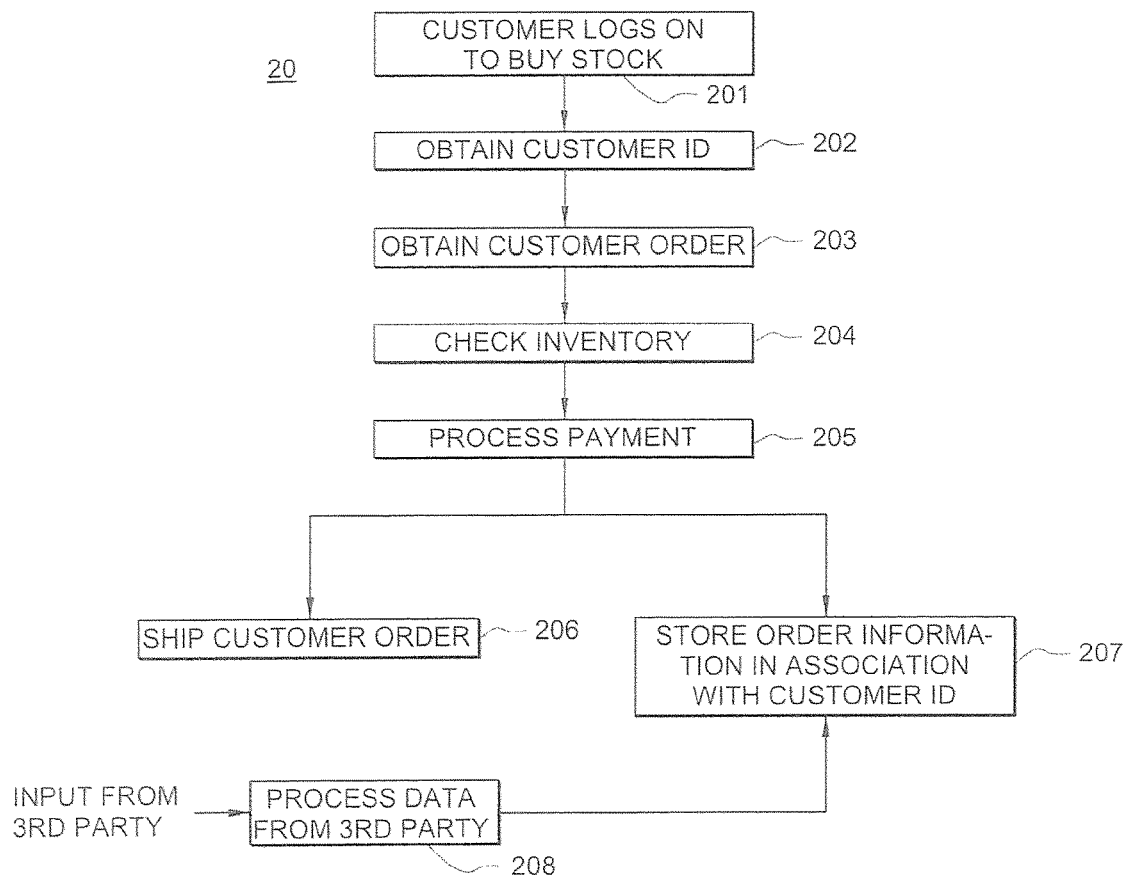
FIG. 2 shows one embodiment of a method for controlling the distribution of stock material.
FIG. 4 shows one embodiment of a rules chart for a few possible fraud situations for use in a rules engine.

FIG. 2 shows one embodiment of a method such as method 20 for allowing a user to purchase stock online. In this embodiment, a customer logs onto the system such as server 13 (FIG. 1) under the control of process 201. Process 202 then obtains the customer id which could include a PIN number or any other method of authentication if desired. The identity could be, for example, electronic information sent from the user, or it could be any other method of identifying a unique customer, or a customer from a group of customers all of which could be authorized to use the same serial number or other control form factor.

Process 203 obtains the customer order for the desired stock. Process 204 checks the inventory to be certain that that order can be fulfilled. Process 205 processes the payment by accepting a credit card or other credit facility. Then, if all appears to be in order, process 206 ships the customer order to the physical location specified by the user.

Process 207 then stores the order information in association with the customer id so that subsequently it can be determined whether the serial number of stock material being utilized for postage printing, as well as the quantity (if desired) of that stock match the user. Note that had the user gone to a source other than the online source at location 120 as discussed above, then the third party who supplied the stock material to the user would have sent the serial number and other identification information to the system for recording as controlled by processes 207 and 208.

Figure 3A:
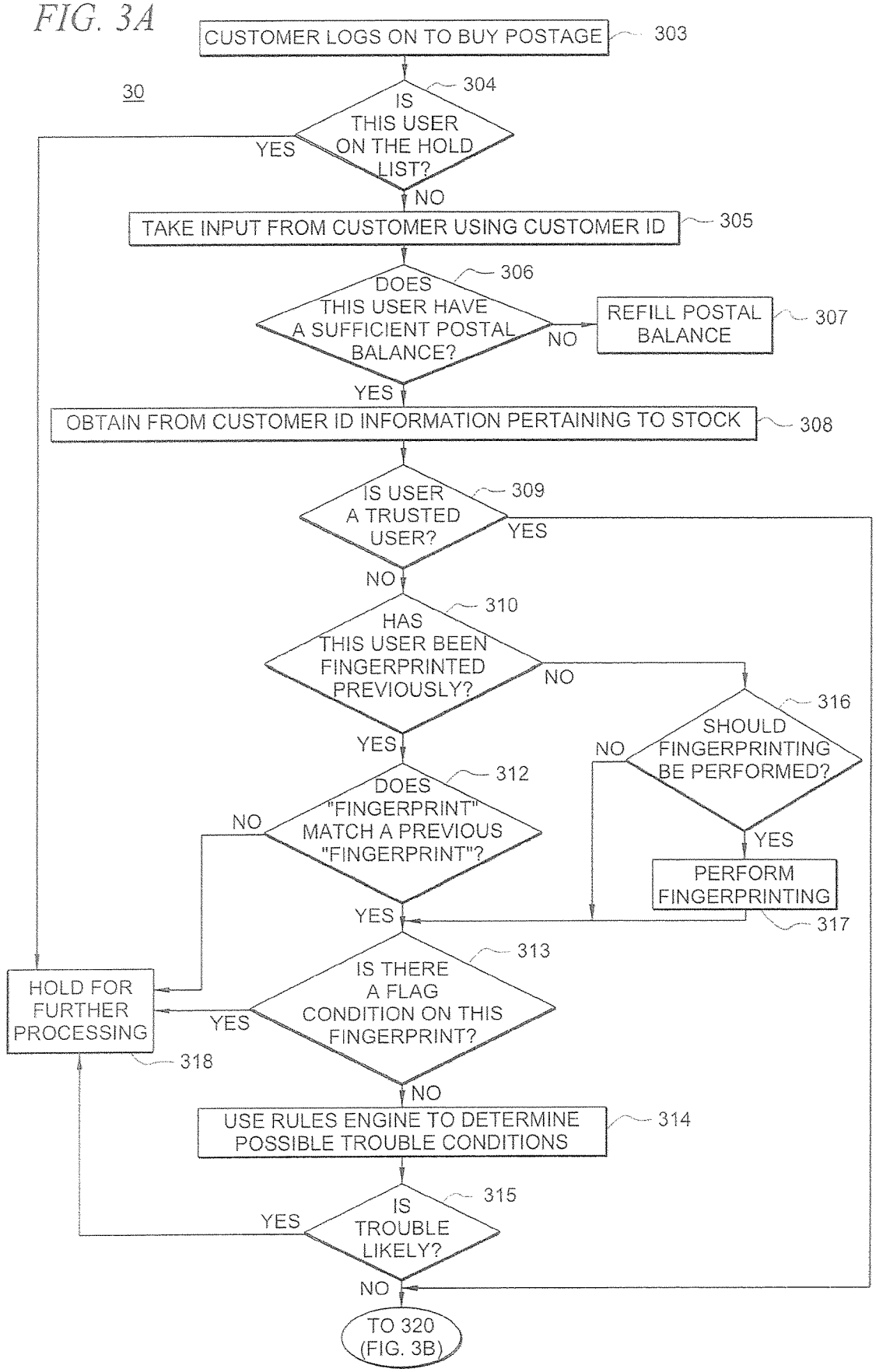

FIGS. 3A and B show one embodiment of a method, such as method 30, for allowing a customer to print postage indicia via an online system. Process 303 allows the customer to log-on to print postage in the well known manner. Process 304 checks for known problems (fraudsters), for example by comparing the customer's software id, or his/her hardware id or printer ids against a stored list of problems from prior transactions. This problem list can be maintained locally or could be obtained remotely, for example, from a national database of known fraudsters. Such a national database can be public or private, as desired.

If the customer is not on the problem list, then process 305 takes the print order from the customer using the customer's id. Note that id need not be a numerical value, but could be any manner of uniquely identifying the customer. Process 306 determines if the customer has previously obtained sufficient postage value to allow for the printing of the desired amount of postage indicia. If not, process 307 interactively works with the customer to replenish the postage value available for use by the customer. When this is complete, or if enough postage value already exists, then process 308 obtains from the customer, either manually, verbally with audio to digital translation or otherwise, the id information pertaining to the stock material that the customer wishes to use to print the postage.

Process 309 determines (optionally) if this user is a trusted user. If so, then the fraud detection (or a portion of the rules within the fraud detection) can be bypassed, if desired. Assuming the id is not one of a trusted user, then process 310 determines if a fingerprint has been taken of this user's equipment. If not, then process 316 determines if a fingerprint should be taken and if so process 317 controls the fingerprinting and storage, perhaps in memory 13-2 (FIG. 1), of the results.

If a previous fingerprint had been taken then process 312 determines if the "fingerprint" of the user's equipment matches the previous fingerprint. If not, then the mismatch can be used, if desired, as an indication that the current transaction is suspect. In such a case, process 318 will hold the transactions for further process, terminate the transaction, turn the transaction over for fraud processing or perhaps just change the rules levels.

When a fingerprint matches a previous fingerprint, process 313 enables the rules engine, such as rules engine 13-3 (FIG. 1) working with processor 13-1 (FIG. 1) to help determine if this user, or the transaction parameters of this transaction, cause concern. In this regard, chart 40 (FIG. 4) is helpful in understanding some of the many possible fraud and/or potential trouble conditions.

For example, line 402 of chart 40, shows that this user (as determined from the user's presented id or fingerprint id) shows how much postage per day this user has been using on average. The chart also could show the average postage per day for all users (or for a portion of users with a similar profile to this user). The rule then could be to only allow, for example, $75 worth of postage each day. The amount limit can be pre-calculated or it can be calculated dynamically based, for example, on factors established by the vendor from time to time and dependent on behaviors of the customer. Line 403 deals with the number of accesses to the system each day by this same user and while the user's number is lower than the average, a limit of 3 times a day is placed on the account, at least until a pattern has emerged.

Line 404 indicates that this user has been known to the system one week or less and until the user has been known to the system for at least 10 weeks the user will be treated with care and the highest level of scrutiny will occur. Note that the different rules and different values for each rule can be used based upon many factors for each user.

Some conditions, such as shown in lines 406 to 409, could be flag conditions such that if any of these transactions were to occur a trouble condition would be triggered. For example, in line 406 this user purchased 1000 sheets of stock material onto which postage indicia is to be printed. The average user in this category of user only buys 100 sheets. This then triggers a flag condition such that when the user logs-in to buy postage indicia his/her account can be immediately flagged for further processing, or more stringent rules can be applied.

Another example of a flag condition is shown in line 408. This user (same id or fingerprint) has switched credit facilities five times within a certain period (or since the user first identified him/herself) where the average number of changes is two times.

Returning now to FIG. 3A, process 315, based on the results of the rules checking, determines whether or not to proceed with supplying value to this user.

Fingerprint checking can be used for many control functions. By way of example, in situation where "specials" are run, such as free (or reduced) postage for a month, providing the customer sign up for a year, some customers may simply use the free postage, cancel their subscription and then, at a later time, sign up again. By maintaining a record of the fingerprint, say of the customer's printer (or software, CPU, etc.) any subsequent "free trial periods" can be blocked under control of processes 313, 314 and 315 based on a fingerprint match to the previous "trial" period.

If process 315 allows fulfillment to continue, then process 320, FIG. 3B, determines if it is necessary to check for paper stock id numbers. If so, process 321 determines if the customer's stock id matches what the system believes is associated with that customer or group of customers. For example, process 315 may access database 13-2, FIG. 1, to see if this customer's id matches the range of ids associated with that customer. Note that the customer may be one of a group of people authorized within a range, or the customer may be a trusted user, in which case checking of the serial numbers may be optional for that user. In this context a trusted user is one where the likelihood of fraud has for one reason or another, such as exemplary behavior over a period of time, is reduced below a threshold.

Process 322 then, if necessary for this user, determines if the stock count is right. This count is necessary in some situations for example, because multiple sheets of material may have the same serial number. If the user has been determined to have used five sheets of material but still has five sheets remaining, the user would be allowed to purchase postage indicia up to five sheets. However, had the customer had five sheets available and this postage indicia would require a sixth sheet, then the sixth sheet worth of postage would be rejected via process 322. The order then would be held for further processing, and/or fraud identification under control of process 326. If process 322 determines that the stock count is right, then process 323 processes the order. This is done, for example, by process 324 which generates postage indicia data from postage vault 17 and transmits this data to PC 11. Process 325 then removes the stock id from the available stock, if applicable, and adjusts the stock count. Process 326 then under control of the customer and PC 11 generates postage indicia from the data transmitted from the system.

Note that chart 40, FIG. 4, shows only a few of the many situations that can be checked, including, for example, a check of the address (both physical and electronic), supplied phone numbers, etc. In some situations, the printer id can be captured and matched to the user. This could be part of the fingerprinting, or a separate operation. This id can be the actual number of the printer (MAC address or otherwise) or it could be a name given to the printer as contained in the operating system. Cookies can be downloaded and information received back pertaining to the identity of the user, if desired, all used by the rules engine and the processor to determine possible fraud conditions.

In some situations the system could be set up to block partial fingerprints, such as a MAC address. However, in some situations it is not practical to simply block the machine because it could be a shared "library" or "kiosk" machine. In those situations, additional detective work will be required to detect possible fraud conditions. In situations such as that, the system could mark the known shared machine as a trusted (or suspicious) location. In all cases, something else may trigger the fraud detection even though the postage is being printed at a trusted location.

Another twist is that the system might be designed to look at the sales channel from which the user is coming. Corporate channels could have less scrutiny than unaffiliated or otherwise unknown individuals. Triggers could be geared to payment type, such that if a user is using certain payment types that are more fraud driven than other types then the rule limits or parameters can be adjusted accordingly.

In some situations the IP address can be used to determine the geographical location of the user's machine. This, of course, can be spoofed, but in fact in many situations it is possible to determine, for example, that a transaction is coming in from outside the United States. The system can block based on the domain, depending on which country the user is coming from.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for detecting fraud in a postage generation request, the method comprising:

authenticating, by a postage server system, a user based on authentication credentials associated with an account of the user;

receiving, by said postage server system, a postage indicium request from a user system subsequent to authenticating the user, wherein said postage server system distributes indicia value data, and wherein said postage indicium request is a request to print a postage indicium;

fingerprinting, by said postage server system, at least a portion of said user system;

determining, by said postage server system, whether said fingerprint matches a previously stored fingerprint associated with said user system;

applying, by a rules engine, a rule set to information associated with said postage indicium request to determine whether said postage indicium request includes fraud indicative parameters, wherein application of said rule set to said information associated with said postage indicium request comprises:

comparing parameters of said postage indicium request to at least a portion of stored user activity of at least said user;

determining whether said postage indicium request includes said fraud indicative parameters that are outside a range of normal parameter values for prior postage indicia requests by said user based on said comparing, wherein said range of normal parameter values for said prior postage indicia requests by said user comprises parameter values based on at least one of a frequency of said prior postage indicia requests by said user, postage values associated with said prior postage indicia requests by said user, a pattern of said prior postage indicia requests by said user, a quantity of stock material associated with said user, and one or more fingerprints of systems of said user; and in response to a determination that said postage indicium request does not include said fraud indicative parameters:

generating, by said postage server system, indicium data comprising information utilized to print said postage indicium; and transmitting, by said postage server system, said indicium data to a user system, wherein said user system prints said postage indicium using said indicium data.

2. The method of claim 1 further comprising:
holding said postage indicium request for further processing in response to a determination that said fingerprint does not match said previously stored fingerprint.

3. The method of claim 1 further comprising:
terminating said postage indicium request in response to a determination that said fingerprint does not match said previously stored fingerprint.

4. The method of claim 1 wherein said postage server system determines whether to allow said postage indicium request based on said determining, by said rules engine, whether said postage indicium request includes said fraud indicative parameters.

5. The method of claim 1 wherein said rules engine is based on dynamically changing rules.

6. The method of claim 1 wherein said fingerprint includes information about at least one of:
a software component of said user system; and
a hardware component of said user system.

7. The method of claim 1 wherein said fingerprint includes information about a printer associated with said user system.

8. A postage fraud prevention system comprising:
a postage server system comprising one or more processors to:

authenticate a user based on authentication credentials associated with an account of the user;

receive a transaction request from a user system associated with the user, wherein said transaction request comprises a request to print a postage indicium;

fingerprint a portion of said user system, wherein said user system prints postage indicia based on indicia data, and wherein said postage server system distributes said indicia data;

determine whether said fingerprint matches a previously stored fingerprint of said user system; and apply, by a rules engine, a set of rules to information associated with said transaction request to determine whether said transaction request includes fraud indicative parameters, wherein application of said set of rules to said information associated with said transaction request comprises:

comparing parameters of said transaction request to at least a portion of stored user activity of at least said user; and determining whether said transaction request includes said fraud indicative parameters that are outside a range of normal parameter values for prior transaction requests by said user based on said comparing, wherein said range of normal parameter values for said prior transaction requests by said user comprises parameter values based on at least one of a frequency of said prior transaction requests by said user, postage values associated with said prior transaction requests by said user, a pattern of said prior transaction requests by said user, a quantity of stock material associated with said user, and one or more fingerprints of systems of said user;

in response to a determination that said transaction request does not include said fraud indicative parameters:

generate indicium data comprising information utilized to print said postage indicium;

transmit said indicium data to said user system, wherein said user system prints said postage indicium using said indicium data; and a memory communicatively coupled to the one or more processors.

9. The postage fraud prevention system of claim 8 wherein said rules engine compares said transaction request with activity of at least one other user system.

10. The postage fraud prevention system of claim 8 wherein a plurality of fingerprints associated with a plurality of user systems are stored at the memory.

11. The postage fraud prevention system of claim 8 wherein said rules engine dynamically updates said set of rules based on said transaction request.

12. The postage fraud prevention system of claim 8 wherein said postage server system determines whether said user system is a trusted user system, and wherein said rules engine ignores said set of rules in response to a determination that said user system is a trusted user system.

13. The postage fraud prevention system of claim 8 wherein said fingerprint includes information about at least one of:
a software component of said user system; and
a hardware component of said user system.

14. The postage fraud prevention system of claim 8 wherein said fingerprint includes information about a particular printer associated with said user system.

15. A method of validating a request comprising:
authenticating, by a postage server system, a user of a user system based on authentication credentials associated with an account of said user;
receiving, by said postage server system, a first request from said user system subsequent to said authenticating, wherein said user system prints postage indicia based on indicia data, and wherein said postage server system distributes said indicia data;
fingerprinting, by said postage server system, a portion of said user system to obtain a first fingerprint in response to said first request;
storing, by said postage server system, user activity regarding said first request;
receiving, by said postage server system, a second request from said user system;
fingerprinting, by said postage server system, a portion of said user system to obtain a second fingerprint in response to said second request;
determining, by said postage server system, whether the first fingerprint and the second fingerprint match; and
in response to a determination that the first fingerprint and the second fingerprint match, applying, by a rules engine, a rule set to information associated with said second request to determine whether said second request includes fraud indicative parameters, wherein application of said rule set to said information associated with said second request comprises:
comparing parameters of said second request to at least a portion of stored user activity of at least said user; and
determining whether said second request includes said fraud indicative parameters that are outside a range of normal parameter values for prior requests by said user based on said comparing, wherein said range of normal parameter values for the prior requests by said user comprises parameter values based on at least one of a frequency of the prior requests by said user, postage values associated with the prior requests by said user, a pattern of the prior requests by said user, a quantity of stock material associated with said user, and one or more fingerprints of systems of said user; and
in response to a determination that said second request does not include said fraud indicative parameters:
generating, by said postage server system, indicium data comprising information utilized to print a postage indicium; and
transmitting, by said postage server system, said indicium data to said user system, wherein said user system prints said postage indicium using said indicium data.

16. The method of claim 15 further comprising:
denying (said second request in response to a determination that said second request includes at least one fraud indicative parameter.

17. The method of claim 16 further comprising:
dynamically updating said rule set based on said second request.

18. The method of claim 15 further comprising:
blocking said user system from future transactions based on said second fingerprint in response to a determination that said second request includes at least one fraud indicative parameter.

19. The method of claim 15 wherein said first fingerprint and said second fingerprint include information about at least one of:
a software component of said user system; and
a hardware component of said user system.

20. The method of claim 15 wherein said first fingerprint and said second fingerprint include information about a printer associated with said user system.

21. The method of claim 15 wherein said postage server system is an Internet-based server and said user system is a remotely located computer.

22. The method of claim 15 wherein said first request is a request to purchase postage value.

23. The method of claim 15 wherein said second request is a request to print said postage indicium.

24. The method of claim 15 further comprising modifying at least one rule of said rule set based on whether the first fingerprint and second fingerprint match.

25. The method of claim 24 wherein said modifying comprises adjusting a limit associated with said at least one rule.

26. The method of claim 1 further comprising modifying at least one rule of said rule set based on whether said fingerprint and said previously stored fingerprint match.

27. The method of claim 26 wherein said modifying comprises adjusting a limit associated with said at least one rule.

28. The postage fraud prevention system of claim 8, wherein the one or more processors of the postage server system adjust at least one rule of said set of rules based on whether said fingerprint and said previously stored fingerprint match.

29. The postage fraud prevention system of claim 28 wherein said adjustment comprises adjusting a limit associated with said at least one rule.

* * * * *